INVENTOR.
Adrian Nagelvoort
Attorneys

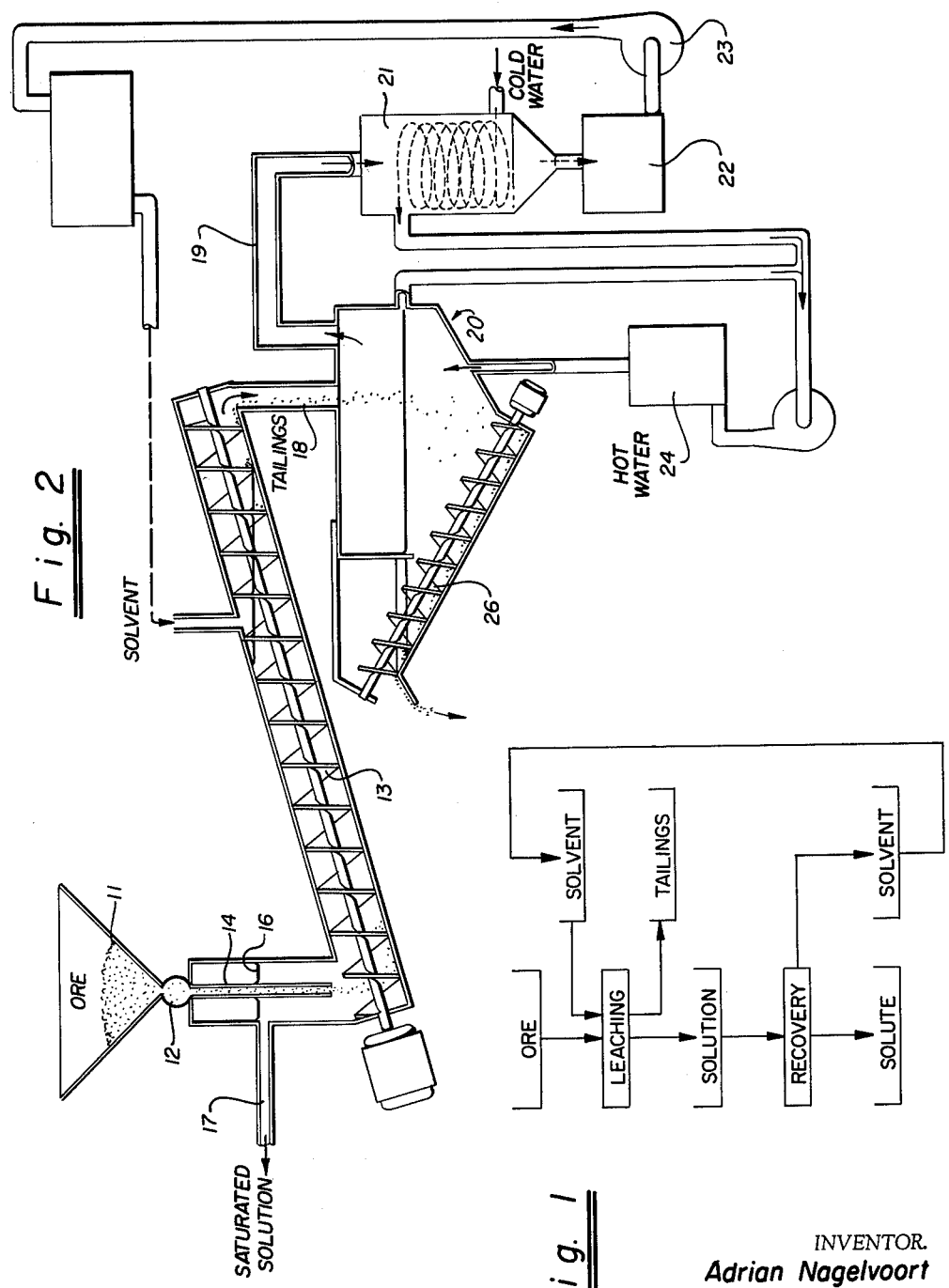

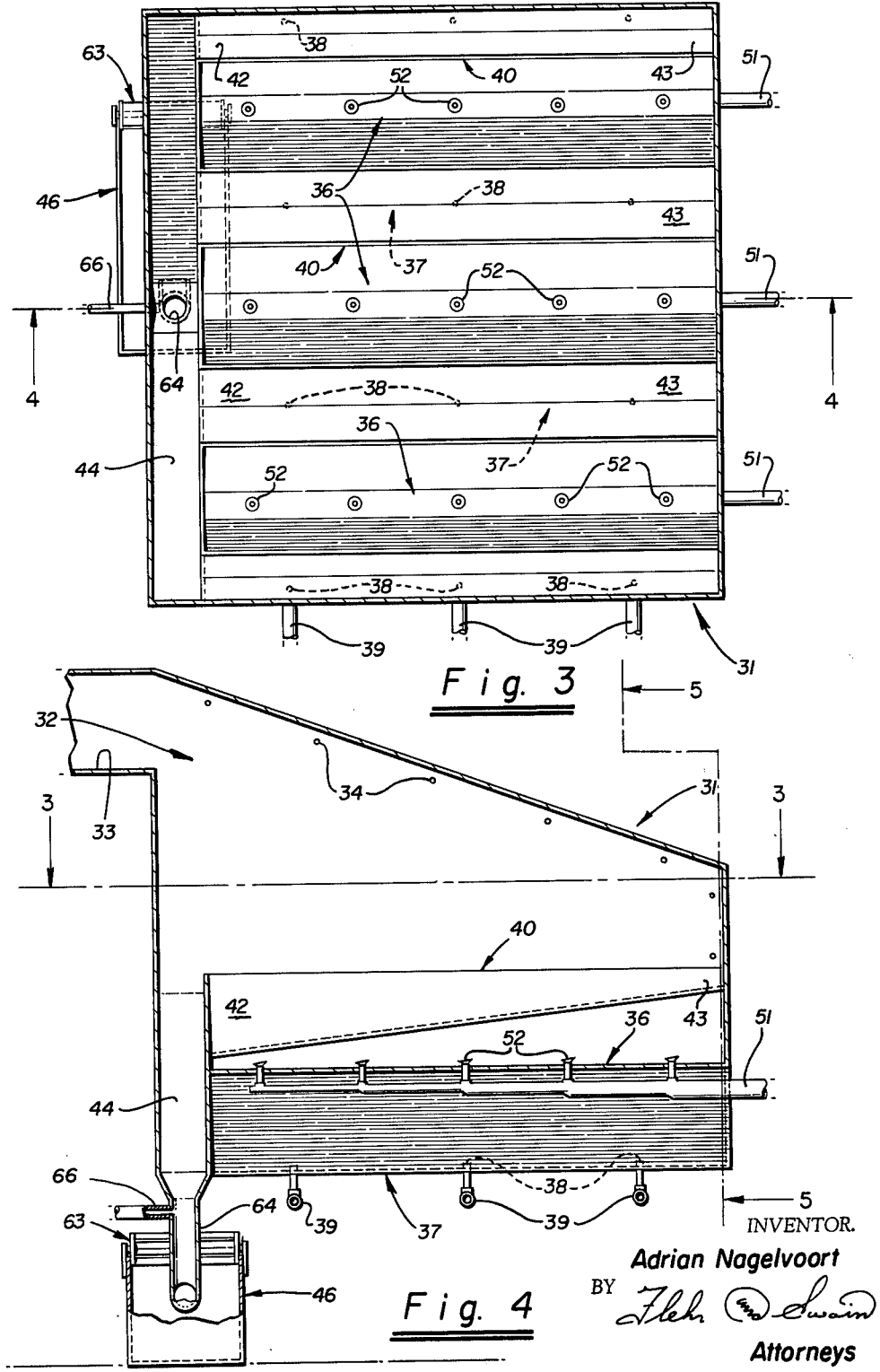

United States Patent Office 3,226,202
Patented Dec. 28, 1965

3,226,202
APPARATUS FOR RECOVERY OF A SOLUTE FROM A VOLATILE SOLVENT
Adrian Nagelvoort, Los Altos, Calif., assignor, by direct and mesne assignments, of one-half to Complex, Incorporated, Menlo Park, Calif., a corporation of California
Filed Aug. 21, 1962, Ser. No. 218,241
1 Claim. (Cl. 23—267)

This invention relates generally to a recovery apparatus and more particularly to a process for the production of relatively pure materials, such as sulphur and resins, in a highly comminuted form.

Elemental sulphur found deep in the earth's surface is, in general, extracted by the Frasch process.

Many attempts have been made to commercially extract pure sulphur (99.5% or better) from surface sulphur ores. Flotation produces a sulphur of about 85% purity with an efficiency of about 90%. Extraction with solvent, the best of which is carbon bisulphide, has been used with more or less success.

Since carbon bisulphide is highly flammable, ovaporating a large body of this solvent to reclaim the solute sulphur is a dangerous operation. In general, the residual sulphur remains in the evaporator and is melted to remove it in liquid form. This a batch-type process.

Resins occur in the natural form. For example, some coals, such as Utah coals, contain substantial amounts of fossil resins. Resins of this type are valuable in many industrial processes; for example, in the production of dielectric and other varnishes, for printer's ink, for the preparation of resinous water-proofing agents, in rubber products and others.

Many attempts have been made to extract resins from resin bearing ores such as coal. One method of extracting the resins is by a solvent extraction process wherein the resin is dissolved and the solution is then evaporated to leave the resin in a highly purified concentrated form. As in the recovery of sulphur, one of the problems is the danger of explosion and fire during evaporation of the solvent. Again, the process is a batch process.

In general, in the prior art processes for the solvent or other type of extraction of sulphur and resins, the relatively pure sulphur or resin is in a solid or large particle form. For many of the uses described above for resin, it is desirable that the resin be in a highly comminuted form. Similarly, finely ground sulphur is needed for many applications, such as agricultural. Thus, it has been necessary to grind the sulphur and resin to make fine particles. Grinding of sulphur is a dangerous process, as is well known.

It is a general object of the present invention to provide an improved recovery apparatus for recovering materials from a solvent.

It is another object of the present invention to provide a continuous recovery apparatus.

It is a further object of the present invention to provide an apparatus for forming resin and sulphur in a highly comminuted form.

It is a further object of the present invention to provide an apparatus for forming materials such as sulphur and resins in a highly pure form.

It is a further object of the present invention to provide a solvent extraction apparatus in which the solution is injected into a liquid body with which it is not miscible to form bubbles leaving the solute in highly comminuted form at the surface of the bubbles.

In general, one form of the apparatus of the present invention employs a reservoir of heated water into which is injected a solution of the materials being separated, for example, a solution of carbon bisulphide having dissolved therein the sulphur or a solution of equal parts hexane and carbon tetrachloride having dissolved therein the resin. Neither of these solutions is miscible with the water. The solvent is selected to have a boiling point considerably below the boiling point of water. As it is injected in the hot water, the solvent evaporates to form bubbles which increase in size as they rise to the surface of the water. The solute, resin or sulphur, in highly comminuted form collects on the surface of the bubble. When the bubble reaches the surface, it bursts and the sulphur or resin floats on the surface of the water where it can be removed. The vaporized solvent is removed, condensed and is available for dissolving additional resin or sulphur.

The foregoing and other objects of the invention will be more clearly apparent from the following description when taken in conjunction with the accompanying drawing.

Referring to the drawing:

FIGURE 1 is a flow sheet showing a typical process;

FIGURE 2 shows equipment suitable for leaching or dissolving the material being processed;

FIGURE 3 is a plan view of the equipment in accordance with the present invention;

FIGURE 4 is a side elevational view of the equipment shown in FIGURE 3; and

Figure 5:
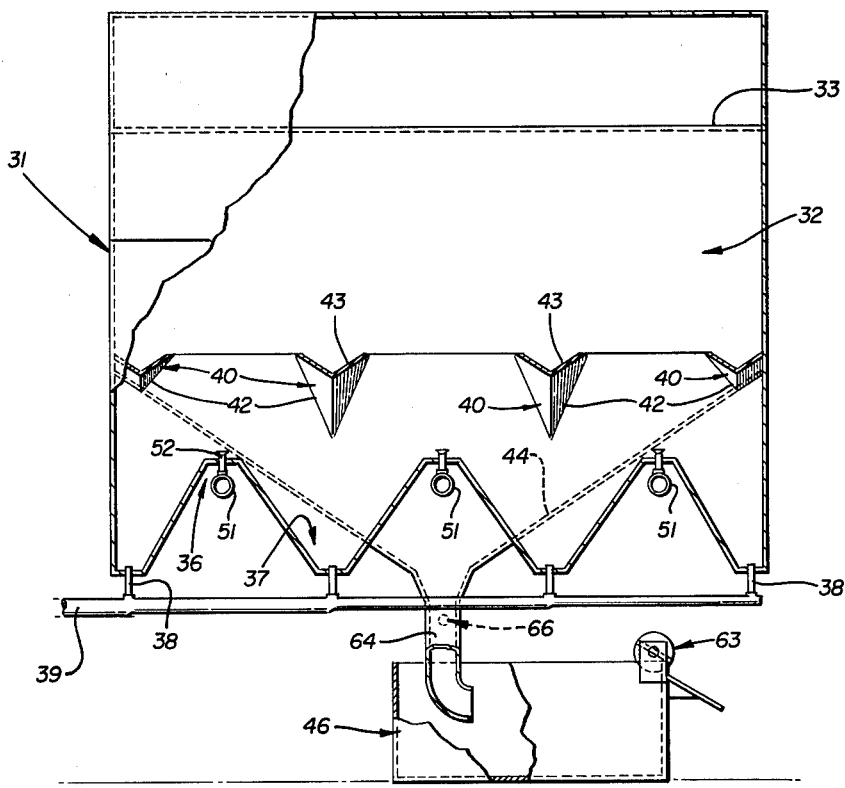
FIGURE 5 is a front elevational view of the equipment shown in FIGURES 3 and 4.

Referring to FIGURE 1, a typical process is shown for extraction of materials, such as sulphur and resin, from an ore. The ore is leached by applying thereto a solvent which serves to extract the material being recovered and form a solution of the same. The tailings are a byproduct and are shown as rejected in this step of the process. Typical equipment for carrying out this step will be presently described. The solution is then directed into recovery equipment wherein the material or solute is recovered and the solvent is continuously recovered for condensing and reuse. Recovery equipment for carrying out this step of the process will be presently described in detail.

In the prior art, the recovery process, as described above, consisted essentially of a batch process wherein the solution was evaporated in a large vessel and then the solute which comprised the materials sought to be recovered is removed either by liquefying, by heat or by other means.

Referring to FIGURE 2, a typical leaching equipment is schematically illustrated. For example, the leaching equipment might comprise a hopper 11 into which the ore is dumped. The ore flows through a one-way valve or other suitable feed means 12 which feeds the ore through the pipe 14 to the bottom of a screw conveyor 13. Pipe 14 extending downwardly from the hopper extends below the surface 16 of the solvent whereby solvent vapors are prevented from escaping through the hopper. The screw conveyor 13 conveys the ore upwardly along the same. As the ore moves upwardly, the solvent is applied at the top and flows downwardly, in countercurrent, to leach the material being recovered from the ore. The solution is removed at 17 and applied to the recovery equipment.

The tailings are removed at 18 into a tank 20. They fall into a heated bath (for example, a water bath). The heated bath serves to evaporate any solvent which is retained by the tailings. The solvent vapors flow through the conduit 19 to the water-cooled condenser 21. The condensed solvent is collected in a reservoir 22 and pumped by means of pump 23 into a storage or surge tank where it is available for application to the leaching apparatus. The water is warmed in the condenser and the warmed water is pumped into a hot water reservoir and heater 24. Hot water is continuously pumped into the tank 20 and the overflow hot water flows back into the hot water heater. Thus, the process minimizes the input energy required to maintain the hot bath by recirculating the hot water and using the heated water from the condenser. As will be presently apparent, the liquid bath may comprise a liquid other than water.

A screw conveyor 26 is provided for removing the tailings from the bottom of the tank. The tailings may be a useful by-product. For example, the tailing in the resin process for recovering resins from coal will be an improved coal, barren of resin.

In accordance with the present invention, there is provided a novel apparatus and method for extracting the dissolved material (solute) from the solution. The process and equipment are efficient, continuous and inexpensive in operation. The danger of explosion or fire is minimized. Furthermore, the process and equipment provide the recovered resin or sulphur in a highly comminuted form.

The apparatus of my invention is illustrated in FIGURES 3–5. The apparatus consists of an enclosed vessel or tank 31 which has an upper section 32 serving to collect the solvent vapors and direct the same upwardly along the inclined top to the vapor outlet 33. In order to minimize condensation of the solvent along the top wall of the vessel, there may be provided a plurality of pipes 34 which include spray heads (not shown) to continuously spray the wall with hot liquid to maintain the temperature of the surfaces above the condensation temperature of the solvent. All of the solvent is conveyed away and none forms droplets which could fall onto the separated material floating in the liquid bath, to be presently described. The solvent vapors are directed to a condenser (not shown) and the liquid solvent then pumped to the surge or storage tank where it is available for use.

The bottom of the vessel 31 includes a plurality of adjacent ridges and troughs 36 and 37, respectively, as shown more clearly in FIGURE 5. The bottom wall serves as the bottom of the vessel, which serves to hold the bath liquid. A plurality of spaced inclined troughs 40, as shown in FIGURES 4 and 5, are spaced from the bottom and coincide generally with the troughs formed in the bottom. The troughs are relatively deep at one end 42 and become shallower towards the other end 43 whereby liquid which spills over into the troughs flows downwardly along the troughs into the outlet 44 and into the receiver 46. Liquid is continuously supplied to the vessel through jets 38 in the pipes 39. It overflows into the troughs 40 and is collected in the receiver.

As previously described, the solution from which the material is to be separated is introduced into the liquid bath. Referring now to FIGURE 5, there is shown a plurality of spaced solution pipes 51 located below the ridges 36 and spaced therefrom. Each of these pipes is provided with a plurality of jets 52 extending upwardly and providing means for injecting the solution into the liquid bath. It is to be noted that the main supply pipe 51 is spaced from the walls of the vessel whereby its temperature may be maintained below the temperature of the liquid within the vessel. As will become presently apparent, this will prevent evaporation of the solvent prior to the injection of the solution into the liquid bath.

When the solution comes into contact with the heated liquid in the bath, the solvent evaporates and forms bubbles which rise towards the surface. As the bubbles increase in size, the rate of evaporation increases. The bubbles rise to the surface. When the bubbles reach the surface, they burst. During this process, the solute collects on the surface of the bubbles in a highly comminuted form. When the bubbles burst, the material floats on the surface of the liquid and spills into the troughs 37 where it flows with the overflow liquid into the receiver. Skimming means 63 are associated with the receiver 46 for skimming off the separated material. In order to minimize the loss of solvent which may be retained on the surface of the separated material, there is provided means 66 for injecting hot steam into the pipe 64 in counter-current to the material liquid mixture as it flows to the receiver. The steam serves to vaporize any solvent which may be entrained in the material being separated. In essence, the steam serves as a one-way trap recovering by vaporizing almost the entire amount of retained solvent.

The process above has been described in general terms since it is applicable to the recovery from solution of many types of materials. It is to be observed that the essential feature is that the liquid in the bath be selected so that the solvent and material are not miscible therewith.

The following two examples illustrate the process as applied to the recovery of sulphur or resin from solution, respectively: (1) When the process is used for the recovery of sulphur, which is hydrophobic, it is preferable to use as the solvent carbon bisulphide ($CS_2$) which is also hydrophobic, and has a low boiling temperature in the neighborhood of 46.2° C. This temperature is ideal since it is high enough to permit handling at normal ambient temperatures and yet far enough below the boiling point of water to allow the use of a hot water bath with the water temperature substantially above the boiling point of the bisulphide to give rapid evaporation.

The sulphur ore is leached with carbon bisulphide and the solution is injected into a hot water bath wherein the carbon bisulphide evaporates and the solid sulphur forms a highly comminuted film on the inside of the bubble. When the bubble bursts, the sulphur floats on the surface of the water bath and is, in essence, decanted by the overflow of water into the receiver. The sulphur is separated from the water by a skimming device.

It has been found that when first injected into the hot water, the carbon bisulphide solution evaporates very rapidly, making a bubble with most of the liquid of the droplets still intact. Pressure developed by the sudden vaporization forms the bubble which is completely immersed in the surrounding wall of water with more and more carbon bisulphide evaporating from the liquid droplets as the bubble rises in the bath. Under the enormous pressure, there is a shell made against the retaining wall being of hot water. When all of the carbon bisulphide has been converted to vapor, there is left the bubble within a dry shell of sulphur. When the bubble bursts at the surface of the water, the particle size of the sulphur is measured in microns. As a matter of contrast, commercially ground sulphur, ground in a mill to produce powdered sulphur for various uses, is much coarser. Such grinding operations are costly and dangerous because sulphur grinding builds up heavy charges of static electricity requiring that the operation be carried out in an inert atmosphere. A further advantage of my process is that the particle size of sulphur produced by my process is not only very small but also very uniform.

(2) When my process is used for recovering resin from coal ore, it includes the step of leaching the coal ore by using, for example, as a solvent a solution having a high proportion of hexane. This solution has a boiling point of about 73° C. Both the solution and the resin are hydrophobic. The water bath is maintained near its boiling point. Sufficient temperature difference is present to cause the vaporization of the solvent and recovery of the resin in fine particles in the manner described above.

Although the specific examples given above employ as a liquid bath, water, and as solvents for the sulphur and resin, carbon bisulphide, and a solution having a high proportion of hexane, respectively, it is known that other solvents exist for these materials. For example, for the recovery of sulphur, the following solvents and baths may be used: toluol, benzene, pentane, hexane and other low boiling petroleums, all with hot water baths; and for the recovery of resin, the above listed solvents and others. When the boiling point of the solvent is near that of water, it is desirable to raise the boiling point of water by adding salts such as sodium chloride, sodium acetate, aluminum chloride, iron sulfate and others well known in the art.

Thus, it is seen that there is described a continuous process and apparatus for use therein for the recovery of materials from a solution. The process is economical, safe and simple. The process provides a highly comminuted material useful directly in many applications without further processing.

I claim:

A recovery apparatus comprising an enclosed vessel, means forming an open reservoir within the vessel to provide a liquid bath therein, means providing a flow of said liquid continuously into the reservoir to fill and overflow same, said means being disposed to introduce said liquid into the reservoir near the bottom of same, means disposed and arranged to inject a solution composed of a solvent and material to be separated, into said reservoir at a point above said first named means to be entrained by said flow of liquid at a point well below the surface of the bath, means for receiving the overflow from said reservoir, and means for recovering said material from said overflow, said reservoir including a bottom formed to include ridges and valleys, said flow of liquid being introduced into said reservoir via said valleys and said solution entering via the tops of said ridges, the sides of said ridges thereby serving to carry said liquid toward the entering solution.

References Cited by the Examiner

UNITED STATES PATENTS

| | | | |
|---|---|---|---|
| 2,088,190 | 7/1937 | Du Pont. | |
| 2,450,547 | 10/1948 | Gaylor | 260—94.95 |
| 2,546,364 | 3/1951 | Klepetko | 202—74 XR |
| 2,614,073 | 10/1952 | Harcourt | 202—74 |
| 2,957,855 | 10/1960 | McLeod | 260—94.95 |
| 2,976,224 | 3/1961 | Gilliland | 202—74 |
| 3,056,772 | 10/1962 | Wallace | 260—94.95 |
| 3,090,774 | 5/1963 | Scoffin | 260—94.95 |

FOREIGN PATENTS 709,414    5/1954    Great Britain.

NORMAN YUDKOFF, *Primary Examiner.*